(12) United States Patent
Kou et al.

(10) Patent No.: US 8,344,074 B2
(45) Date of Patent: Jan. 1, 2013

(54) POLYAMINE-POLYACRYLATE DISPERSANT

(75) Inventors: Huiguang Kou, Shanghai (CN); Yanfei Liu, Shanghai (CN)

(73) Assignee: BASF SE, Ludwigshafen (DE)

( * ) Notice: Subject to any disclaimer, the term of this patent is extended or adjusted under 35 U.S.C. 154(b) by 474 days.

(21) Appl. No.: 12/528,495

(22) PCT Filed: Feb. 25, 2008

(86) PCT No.: PCT/EP2008/052214
§ 371 (c)(1),
(2), (4) Date: Aug. 25, 2009

(87) PCT Pub. No.: WO2008/107326
PCT Pub. Date: Sep. 12, 2008

(65) Prior Publication Data
US 2010/0280183 A1    Nov. 4, 2010

(30) Foreign Application Priority Data

Mar. 5, 2007  (EP) .................................. 07103528

(51) Int. Cl.
C08F 283/04    (2006.01)

(52) U.S. Cl. ........ 525/422; 524/514; 524/536; 524/879; 525/218; 525/411; 525/417; 525/426

(58) Field of Classification Search .................. 525/218, 525/411, 417, 422, 426; 524/514, 536, 879
See application file for complete search history.

(56) References Cited

U.S. PATENT DOCUMENTS

| | | | |
|---|---|---|---|
| 4,735,984 A | 4/1988 | Gouji | |
| 4,861,380 A | 8/1989 | Campbell et al. | |
| 4,910,268 A * | 3/1990 | Kobayashi | 525/411 |
| 5,153,273 A * | 10/1992 | Kobayashi | 525/412 |
| 5,589,522 A * | 12/1996 | Beach et al. | 523/160 |
| 5,700,395 A | 12/1997 | Thetford | |
| 6,197,877 B1 | 3/2001 | Thetford et al. | |
| 6,310,010 B1 * | 10/2001 | Higton et al. | 508/192 |
| 6,562,926 B1 * | 5/2003 | Decker et al. | 526/312 |
| 6,583,213 B1 | 6/2003 | Fawkes et al. | |
| 6,599,947 B2 | 7/2003 | Thetford | |
| 7,323,110 B1 * | 1/2008 | Li | 210/767 |
| 7,998,279 B2 * | 8/2011 | Schutz et al. | 134/25.2 |
| 2002/0143081 A1 * | 10/2002 | Li et al. | 523/201 |
| 2003/0027873 A1 | 2/2003 | Thetford | |
| 2003/0158344 A1 * | 8/2003 | Rodriques et al. | 525/242 |
| 2003/0181544 A1 | 9/2003 | Thetford et al. | |
| 2005/0209113 A1 * | 9/2005 | Goldblatt | 508/454 |
| 2006/0183815 A1 | 8/2006 | Alzer | |
| 2008/0026972 A1 * | 1/2008 | Mathur et al. | 508/545 |
| 2008/0125540 A1 | 5/2008 | Thetford | |
| 2010/0113709 A1 * | 5/2010 | Kou et al. | 525/389 |
| 2010/0174046 A1 * | 7/2010 | Liu et al. | 528/332 |

FOREIGN PATENT DOCUMENTS

| | | | |
|---|---|---|---|
| CN | 1846833 A | | 10/2006 |
| EP | 0208041 A2 | | 1/1987 |
| EP | 1327915 | * | 1/2003 |
| WO | 94/21368 A1 | | 9/1994 |
| WO | 98/19784 A1 | | 5/1998 |
| WO | 99/49963 A1 | | 10/1999 |
| WO | 99/55763 A1 | | 11/1999 |
| WO | 00/24503 A1 | | 5/2000 |
| WO | 0180987 A2 | | 11/2001 |
| WO | 2004/078333 A1 | | 9/2004 |
| WO | 2005/010109 A2 | | 2/2005 |

OTHER PUBLICATIONS

Lupasol PS Technical Bulletin. Obtained from: http://worldaccount.basf.com/wa/NAFTA~en_US/Catalog/ChemicalsNAFTA/doc4/BASF/PRD/30048287/.pdf?title=&asset_type=pds/pdf&language=EN&urn=urn:documentum:eCommerce_sol_EU:09007bb280020134.pdf on Aug. 9, 2012. No Author, published in 2005.*
Copending U.S. Appl. No. 12/225,642.
Copending U.S. Appl. No. 12/442,142.

* cited by examiner

*Primary Examiner* — Liam Heincer
*Assistant Examiner* — Michael A Salvitti
(74) *Attorney, Agent, or Firm* — Shruti Costales

(57) ABSTRACT

The invention relates to a liquid dispersant based on polyamine-graft-polyacrylate blend, its preparation and its use in solvent borne systems, especially to a polyamine-g-polyacrylate grafted copolymer blend of the general formula (1) or a mixture of formula (1) and YT-(A1,A2)-Y1 wherein T is a polyamine or polyimine, A1 is a bridging bond which is selected from amide or amide, A2 is a —N—C— bridging bond, Y is an acrylate residue of the general formula (2), wherein, $R_1$ and $R_2$ are, independently, hydrogen or $C_{1-20}$alkyl, aryl, heteroaryl, substituted aryl. n is a number of 1-1000, wherein the polyamine-g-polyacrylate grafted copolymer blend has an average molecular weight of 50 000 g/mol to 150 000 g/mol and a polydispersity $M_w/M_n$ is greater than 3.

T-(A1, A2)-Y    1

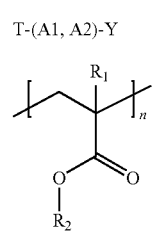

2

4 Claims, No Drawings

POLYAMINE-POLYACRYLATE DISPERSANT

The invention relates to a liquid dispersant based on polyamine-graft-polyacrylate blend, its preparation and its use in solvent borne systems.

Polyethyleneimine-polymethylmethacrylates are known from U.S. Pat. No. 6,573,313 describing the preparation of a core shell latex obtained by an emulsion radical polymerization process which involves generating radicals on the nitrogen atoms of polyamine, which can then initiate the radical polymerization of acrylates. Products are supposed to be used as gene delivery carriers.

Grafted copolymers used as dispersants are e.g. polyamine-g-polyesters or polyamine-g-polyethers. The publications WO00/024503, WO04/078333, WO99/049963, WO94/021368 refer to a series of PAI-based dispersants, of which the graft chain is end-cupped with one acid group, obtained from the condensation polymerization of hydroxycarboxylic acids, grafted onto PAI through both neutralization and amidification reactions between acid and amine groups. The graft chains are non-polar. Dispersants are mainly used in non-polar solvent-borne paint systems.

The publications WO01/080987, WO98/019784, U.S. Pat. No. 9,599,947, EP0208041 and WO99/055763, U.S. Pat. No. 6,583,213 claim a series of PAI-based dispersants, of which the graft chains are obtained from the ring-opening polymerization of lactones and/or their derivatives. The graft chain is polyester end-capped with one acid group, obtained by the carboxylic acid initiated ring-opening polymerization of lactones or alkyl substituted lactones, grafted onto PAI through both neutralization and amidification reactions between acid and amine groups; or the graft chain is polyester end-capped with one ethylenically unsaturated group, obtained by 2-hydroxy ethyl acrylate initiated ring-open polymerization of lactones, grafted onto PEI backbone via the Michael addition.

WO05/010109 claims a kind of PAI-based polyether liquid dispersant. The grafting chain is polyether end-capped with one acid group, which is obtained by the esterification of succinic anhydride and $CH_3\text{-}(EO)_m\text{-}(PO)_n\text{-}NH_2$. This polyether chain is grafted onto PAI via both neutralization and amidification reactions. The dispersants are applied in polar organic or water-borne paint systems.

Commonly, the graft chains of the claimed PAI-g-polyesters and PAI-g-polyethers possess high $T_g$ and crystallizability, which confine their uses, e.g. low temperature applications are impossible, the storage stability is not good and so on. Besides that, these dispersants are all prepared by the "graft to" approach, i.e. synthesis the graft side chains first and then graft them onto the PAI backbones, thus at least two or multi-steps are needed for manufacturing.

US2002/143081 discloses amphiphilic nanoparticles comprising a core and a shell. The process for the manufacture of the particles involves graft polymerisation in an aqueous system of a vinylic monomer onto polyethyleneimine. The molecular weights of the graft copolymer and of the polymethylmethacrylate homopolymer range between 500 000 and 1000 000. The polydispersity Mw/Mn of the polymerized vinylic monomer ranges between 1.5 and 3. The core shell particles are used, for example, as drug carriers. It is only mentioned that the polymers find potential applications in leather finishing, paints paper and textile industrials. The use as dispersant is not specifically disclose.

One aspect of the invention is to provide a liquid dispersant having a good storage stability which can be used for low temperature applications and low viscosity applications in solvent based systems.

Thus, the invention relates to a liquid polyamine-g-polyacrylate grafted copolymer blend of the general formula 1 or a mixture of formula 1 and Y $$T\text{-}(A1,A2)\text{-}Y \qquad 1$$

wherein
T is a polyamine or polyimine,
A1 is a bridging bond which is selected from amide

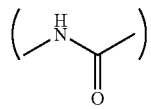

or imide

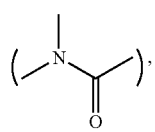

A2 is a —N—C— bridging bond,
Y is an acrylate residue of the general formula 2,

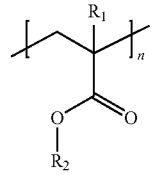

wherein,
$R_1$ and $R_2$ are, independently, hydrogen or $C_{1-20}$alkyl, aryl, heteroaryl, substituted aryl,
n is a number of 1-1000, and
wherein the polyamine-g-polyacrylate grafted copolymer blend has an average molecular weight of 50 000 g/mol to 150 000 g/mol and a polydispersity $M_w/M_n$ greater than 3.

DEFINITIONS

The term "grafted copolymer" as used herein refers to a copolymer made by the so called "grafting from" process. Acrylate groups are attached as pendent groups along the polyamine backbone. The side chains are build up after being grafted to the polyamine backbone.

Liquid means no crystallization.

The term "polyamine-g-polyacrylate grafted copolymer blend" means that more than one copolymer is present obtainable by free-radical polymerization (A2=NC), Michael addition (A2=N—C) and transesterification (A1=amide or imide).

The term "polyamine" means a compound comprising two or more primary or secondary amine groups per molecule. Polyamines are selected from poly($C_{2-6}$-alkyleneimine), poly-vinylamine, polyallylamine or poly(amide-amine) dendrimer, with a MW of 100-100,000 g/mol, preferably 500-50,000 g/mol.

Poly($C_{2-6}$-alkyleneimines) are e.g. polypropylene-imine or polyethylene imine, preferably polyethyleneimine.

n is preferably 5 to 100. The polyacrylate chain (n>1) is obtainable from homo-polymerization of one kind of acrylate monomers, or from random copolymerization of two or more kinds of different acrylate monomers.

$R_1$ is preferably hydrogen or methyl.

$R_2$ is preferably hydrogen or an alkyl chain having 1-20 carbon atoms including linear or branched chains. Examples are methyl, ethyl, propyl, isopropyl, n-butyl, sec. butyl, tert. butyl, n-hexyl, 2-hydroxy ethyl, 2-methoxy ethyl, 2-ethoxy ethyl, bornyl, isobornyl, isodecyl, lauryl, myristyl, stearyl, cyclohexyl.

Aryl is preferably phenyl, naphthyl.

Substituted aryl is preferably substituted phenyl and substituted naphthyl with the substituent of methyl, ethyl, propyl, isopropyl, n-butyl, sec. butyl, tert. butyl, n-hexyl, chloro.

Heteroaryl is preferably bornyl, isobornyl, furfuryl.

Preferred is a liquid polyamine-g-polyacrylate grafted copolymer blend according to claim 1, wherein T is polyethyleneimine, $R_1$ is hydrogen or methyl and $R_2$ is $C_{1-20}$alkyl and n is 5 to 100.

Process

The inventive polyamine-g-polyacrylate grafted copolymer blend is prepared by copolymerizing in an organic solvent a polyamine and an acrylate monomer in the presence of a free radical initiator wherein
1. the weight ratio of polyamine to the acrylate monomer ranges from 1:5 to 1:100;
2. the weight ratio of free radical initiator to acrylate monomer ranges from 1:5 to 1:100;
3. the process being carried out in one pot at a temperature of from 10° C. to 200° C. under an inert gas atmosphere,
4. the process comprising at least a transesterification reaction of the acrylate with the polyamine to obtain a polyamine amide or a polyamine imide, a Michael addition reaction of a polyamine with an acrylate monomer to obtain a polyamine acrylate and a grafting polymerisation of a polyamine and acrylate monomers to obtain polyamine-g-polyacrylate.

The invention further relates to a liquid polyamine-g-polyacrylate grafted copolymer blend obtainable by a process according to the above process.

Acrylate monomers can be represented as $CH_2=CR_1COOR_2$ where $R_1$ and $R_2$ are, independently, hydrogen or alkyl, aryl, heteroaryl, substituted aryl, such as n-butyl acrylate, methyl acrylate, methyl methacrylate, isobutyl methacrylate, tert-butyl acrylate, n-butyl methacrylate, 2-hydroxylethyl acrylate, 2-hydroxylethyl methacrylate, isobornyl acrylate, isobornyl methacrylate, glycidyl methacrylate, glycidyl acrylate, cyclohexyl acrylate, cyclohexyl methacrylate, etc.

Free radical initiators can be selected from 2,2'-azo-bis (isobutyronitrile) (AIBN), potassium persulfate, 2,2'-azobis (2-amidinopropane) dihydrochloride, and alkyl hydro-peroxides, such as benzoyl peroxide, di-tert-butyl peroxide, t-butyl hydroperoxide, cumene hydroperoxide, p-isopropyl cumene hydroperoxide, p-menthane hydroperoxide, or pinane hydroperoxide, etc.

Preferred is 2,2'-azo-bis(isobutyronitrile).

The weight ratio of polyamine to the acrylate monomer is preferably 1:5 to 1:50.

The weight ratio of free radical initiator to acrylate monomer is preferably 1:5 to 1.50.

This weight ratio determines the molecular weight of the polyacrylate moiety.

The reaction temperature is preferably 20° C. to 120° C.

Inert gas is preferably nitrogen.

The scheme below is a representative reaction scheme for the preparation of the polyamine-g-polyacrylate grafted copolymer blend.

The transesterification reaction can be described as follows:

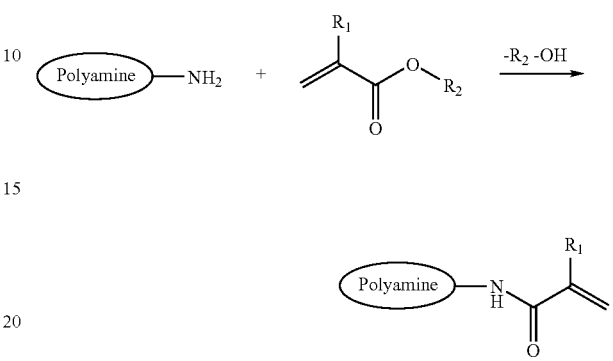

A polyamine amide is obtained by the above shown transesterification process. In the presence of the free radical initiator the polyamine amide is further reacted to polyamine amid-polyacrylate copolymer of the formula A, wherein $R_1$ and $R_2$ are as defined above.

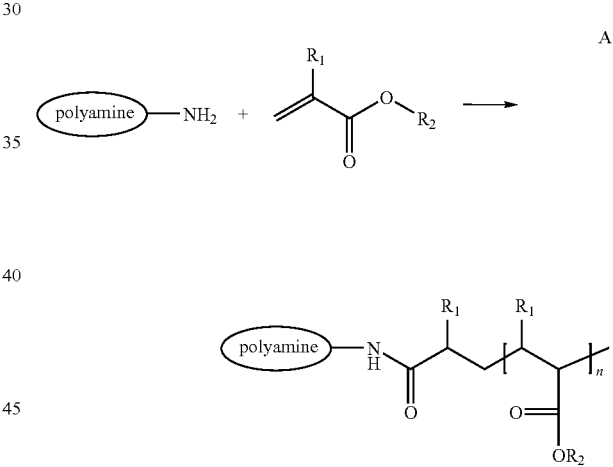

The Michael addition can be described as follows:

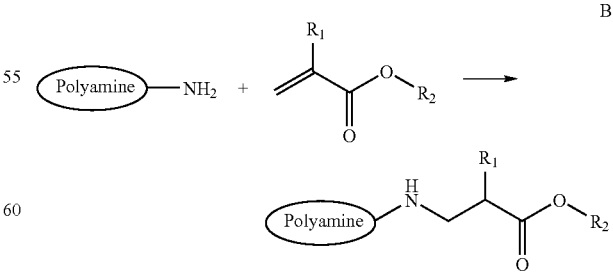

The nucleophilic addition of the polyamine to the unsaturated bond of the acrylate leads to a polyamine acrylate of the formula B, wherein $R_1$ and $R_2$ are as defined above.

The grafting copolymerization can be described as follows

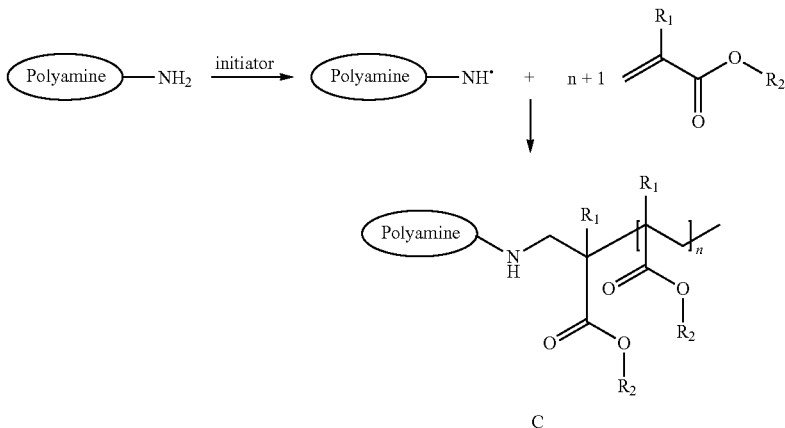

In a grafting from process the polyamine is used as macroinitiator to initiate the free radical polymerization. The acrylate chain is built up to obtain a polyamine-g-polyacrylate of the formula C, wherein $R_1$ and $R_2$ are as defined above.

The radical polymerisation leads to polyacrylates Y.

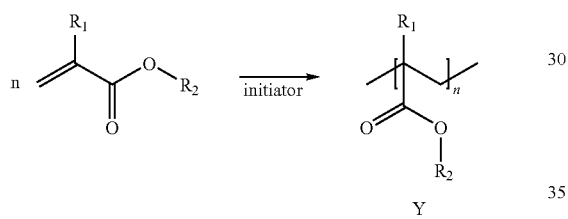

The invention further relates to a liquid polyamine-g-polyacrylate grafted copolymer blend comprising a blend of

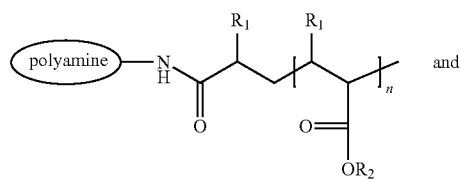
and

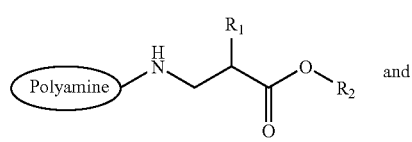
and

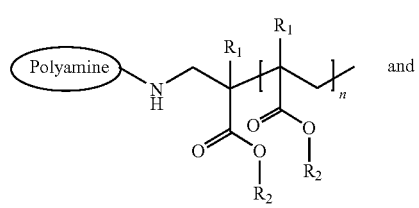
and

-continued

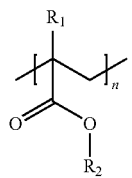

wherein $R_1$, and $R_2$ and n is as defined above and wherein the polyamine-g-polyacrylate grafted copolymer blend has an average molecular weight of 50 000 g/mol to 150 000 g/mol and a polydispersity $M_w/M_n$ greater than 3.

The blend comprising (A+B+C+Y) is a transparent amber liquids with low $T_g$ and no crystallization. The blend is used as dispersant for all low temperature applications. The dispersants are soluble in various organic solvents in a wide range of non-polar to polar. In applications, the dispersants surprisingly show excellent pigment dispersion effect, especially for TPA paints due to good compatibility of the dispersants with TPAs. As a consequence, the pigment concentrates show low viscosity, which means high pigment loading and therefore high productivity can be achieved. The dispersants show less flocculation, less seeding, high gloss, better chromatic properties, lower viscosity of pigment concentrates, lower temperature storage stability etc. The coatings show high gloss and good chromatic properties, an obvious superior performance to the prior arts are achieved in alkyd, CAB and TPA paint systems.

Dispersant solutions keep stable at lower temperatures (50% solutions, stable at <−15° C. for at least 2 weeks), which means the invention product is easy in use, and can be applied in the low temperature applications.

In addition, the glass transition temperature, crystallizability, and polarity of the dispersants can be easily adjusted by adjusting the type of acrylate monomer, the ratio of acrylate monomer to polyamine, the ratio of free radical initiator to acrylate monomer, and reaction conditions.

Accessibility of the Starting Materials

Polyethyleneimine with different molecular weight are commercial products from Nippon Shukubai.

Polyvinylamine with the MW 10,000 are commercially available from Mitsubishi Kasei.

Polyallylamine with MW of 10,000 are commercially available from Nitto Boseki.

Polypropyleneimine dendrimer are commercially available from DSM Fine Chemicals, and poly(amide-amine) dendrimer are commercially available from Aldrich Chemical Company.

Acrylate monomers, 2,2'-azo-bis(isobutyronitrile) and t-butyl hydroperoxide are normal commercial products.

Use

The polyamine-g-polyacrylate grafted copolymer blend can be used as dispersant in a broad application fields, such as coatings, inks, electronic materials, especially in low temperature and low viscosity applications.

The inventive polyamine-graft-polyacrylates are used in solvent based systems such as in solvent based organic and inorganic pigments dispersion e.g. in alkyd, CAB (cellulose acetate butyrate), UV (Ultraviolet) and TPA (thermoplastic acrylate) paint systems, in general industrial coatings especially in automotive coatings, as well as in printing inks and graphic arts.

EXAMPLES

Example 1

The mixture of PEI SP-200 (MW 10,000) 5.0 g, BA 50.0 g, AIBN 6.3 g, and toluene 85 mL were stirred under nitrogen at 35° C. for 24 h, and then 60° C. for 70 h. Then, toluene was removed under vacuum system. The product was obtained as a yellow liquid.

| Abbreviations of chemicals and their suppliers | | |
|---|---|---|
| ABBREVIATION | CHEMICAL NAME | SUPPLIER |
| PEI | Polyethyleneimine | Nippon Shukubai |
| PVA | Polyvinylamine | Mitsubishi Kasei |
| PAA | Polyallylamine | Nitto Boseki |
| DPPI | Dendritic polypropyleneimine | DSM Fine Chemicals |
| DPAMAM | Dendritic poly(amide-amine) | Aldrich Chemical Company |
| TEPA | Tetraethylene pentamine | |
| BA | n-Butyl acrylate | |
| MA | Methyl acrylate | |
| MMA | Methyl methacrylate | |
| i-BMA | Iso-butyl methacrylate | |
| t-BA | Tert-butyl acrylate | |
| BMA | n-Butyl methacrylate | |
| AIBN | 2,2'-Azo-bis(isobutyronitrile) | |
| TBHP | t-Butyl hydroperoxide | |
| d-TBP | Di-tert-butyl peroxide | |
| BPO | Benzoyl peroxide | |

Example 2-64

Example 2-64 were all prepared in a similar manner as Example 1 except that the type and amounts of polyamine, acrylate monomer, free radical initiator, and the reaction condition were varied as detailed in Table 1 below.

TABLE 1

| | Raw materials | | | | |
|---|---|---|---|---|---|
| Example | Polyamine | Acrylate monomer | Free radical initiator | Reaction condition | Appearance |
| 2 | PEI, SP-200 5.0 g | BA 100 g | AIBN 6.3 g | 35° C. for 24 h 60° C. for 70 h | yellow liquid |
| 3 | PEI, SP-200 5.0 g | BA 150 g | AIBN 6.3 g | 35° C. for 24 h 60° C. for 70 h | viscous yellow liquid |
| 4 | PEI SP-018 (MW 1,800) 5.0 g | BA 100 g | AIBN 6.3 g | 35° C. for 24 h 60° C. for 70 h | yellow liquid |
| 5 | PEI SP-006 (MW 600) 5.0 g | BA 100 g | AIBN 6.3 g | 35° C. for 24 h 60° C. for 70 h | yellow liquid |
| 6 | TEPA 3.0 g | BA 100 g | AIBN 6.3 g | 35° C. for 24 h 60° C. for 70 h | yellow liquid |
| 7 | PVA200 (MW 10,000) 3.3 g | BA 100 g | AIBN 6.3 g | 35° C. for 24 h 60° C. for 70 h | viscous yellow liquid |
| 8 | PAA150 (MW 10,000) 4.4 g | BA 100 g | AIBN 6.3 g | 35° C. for 24 h 60° C. for 70 h | viscous yellow liquid |
| 9 | DPPI CU-D32 (MW 3,500) 8.5 g | BA 100 g | AIBN 6.3 g | 35° C. for 24 h 60° C. for 70 h | yellow liquid |
| 10 | DPPI CU-D64 (MW 7,100) 8.5 g | BA 100 g | AIBN 6.3 g | 35° C. for 24 h 60° C. for 70 h | yellow liquid |
| 11 | DPAMAM(G3) (MW 6,900) 16.7 g | BA 100 g | AIBN 6.3 g | 35° C. for 24 h 60° C. for 70 h | yellow liquid |
| 12 | DPAMAM(G4) (MW 14,200) 17.1 g | BA 100 g | AIBN 6.3 g | 35° C. for 24 h 60° C. for 70 h | yellow liquid |
| 13 | PEI, SP-200 5.0 g | BA 100 g | AIBN 5.0 g | 35° C. for 24 h 60° C. for 70 h | yellow liquid |
| 14 | PEI, SP-200 5.0 g | BA 100 g | AIBN 3.8 g | 35° C. for 24 h 60° C. for 70 h | viscous yellow liquid |
| 15 | PEI, SP-200 5.0 g | BA 100 g | AIBN 2.5 g | 35° C. for 24 h 60° C. for 70 h | viscous yellow liquid |
| 16 | PEI, SP-200 5.0 g | BA 100 g | AIBN 1.7 g | 35° C. for 24 h 60° C. for 70 h | viscous yellow liquid |

TABLE 1-continued

| Example | Polyamine | Acrylate monomer | Free radical initiator | Reaction condition | Appearance |
|---|---|---|---|---|---|
| 17 | PEI, SP-200 5.0 g | BA 100 g | AIBN 6.3 g | 35° C. for 24 h 60° C. for 30 h | yellow liquid |
| 18 | PEI, SP-200 5.0 g | BA 100 g | AIBN 6.3 g | 35° C. for 24 h 60° C. for 100 h | yellow liquid |
| 19 | PEI, SP-200 5.0 g | BA 100 g | AIBN 6.3 g | 35° C. for 24 h 60° C. for 120 h | yellow liquid |
| 20 | PEI, SP-200 5.0 g | BA 100 g | AIBN 6.3 g | 35° C. for 24 h 90° C. for 20 h | yellow liquid |
| 21 | PEI, SP-200 5.0 g | BA 100 g | AIBN 6.3 g | 35° C. for 24 h 90° C. for 50 h | yellow liquid |
| 22 | PEI, SP-200 5.0 g | BA 100 g | AIBN 6.3 g | 35° C. for 24 h 90° C. for 80 h | yellow liquid |
| 23 | PEI, SP-200 5.0 g | BMA 111 g | AIBN 6.3 g | 35° C. for 24 h 60° C. for 70 h | viscous yellow liquid |
| 24 | PEI, SP-200 5.0 g | MA 67 g | AIBN 6.3 g | 35° C. for 24 h 60° C. for 70 h | viscous yellow liquid |
| 25 | PEI, SP-200 5.0 g | MMA 78 g | AIBN 6.3 g | 35° C. for 24 h 60° C. for 70 h | solid |
| 26 | PEI, SP-200 5.0 g | t-BA 100 g | AIBN 6.3 g | 35° C. for 24 h 60° C. for 70 h | viscous yellow liquid |
| 27 | PEI, SP-200 5.0 g | i-BMA 111 g | AIBN 6.3 g | 35° C. for 24 h 60° C. for 70 h | viscous yellow liquid |
| 28 | PEI, SP-200 5.0 g | BA 100 g | TBHP 6.9 g | 35° C. for 24 h 90° C. for 70 h | yellow liquid |
| 29 | PEI, SP-200 5.0 g | BA 100 g | TBHP 5.5 g | 35° C. for 24 h 90° C. for 70 h | yellow liquid |
| 30 | PEI, SP-200 5.0 g | BA 100 g | TBHP 4.1 g | 35° C. for 24 h 90° C. for 70 h | yellow liquid |
| 31 | PEI, SP-200 5.0 g | BA 100 g | TBHP 2.8 g | 35° C. for 24 h 90° C. for 70 h | viscous yellow liquid |
| 32 | PEI, SP-200 5.0 g | BA 100 g | TBHP 1.4 g | 35° C. for 24 h 90° C. for 70 h | viscous yellow liquid |
| 33 | PEI, SP-200 5.0 g | BA 100 g | TBHP 6.9 g | 35° C. for 24 h 120° C. for 20 h | yellow liquid |
| 34 | PEI, SP-200 5.0 g | BA 100 g | TBHP 6.9 g | 35° C. for 24 h 120° C. for 40 h | yellow liquid |
| 35 | PEI, SP-200 5.0 g | BA 100 g | TBHP 6.9 g | 35° C. for 24 h 120° C. for 80 h | yellow liquid |
| 36 | PEI, SP-200 5.0 g | BA 100 g | d-TBP 5.6 g | 35° C. for 24 h 90° C. for 70 h | yellow liquid |
| 37 | PEI, SP-200 5.0 g | BA 100 g | d-TBP 3.4 g | 35° C. for 24 h 90° C. for 70 h | yellow liquid |
| 38 | PEI, SP-200 5.0 g | BA 100 g | BPO 10.6 g | 35° C. for 24 h 90° C. for 70 h | yellow liquid |
| 39 | PEI, SP-200 5.0 g | BA 100 g | BPO 6.4 g | 35° C. for 24 h 90° C. for 70 h | yellow liquid |
| 40 | PEI, SP-200 5.0 g | BA 80 g MMA16 g | AIBN 6.3 g | 35° C. for 24 h 60° C. for 70 h | yellow liquid |
| 41 | PEI, SP-200 5.0 g | BA 60 g MMA 31 g | AIBN 6.3 g | 35° C. for 24 h 60° C. for 70 h | viscous yellow liquid |
| 42 | PEI, SP-200 5.0 g | BA 60 g MA 27 g | AIBN 6.3 g | 35° C. for 24 h 60° C. for 70 h | viscous yellow liquid |
| 43 | PEI, SP-200 5.0 g | BA 60 g t-BA 40 g | AIBN 6.3 g | 35° C. for 24 h 60° C. for 70 h | yellow liquid |
| 44 | PEI, SP-200 5.0 g | BA 60 g BMA 44 g | AIBN 6.3 g | 35° C. for 24 h 60° C. for 70 h | viscous yellow liquid |
| 45 | PEI, SP-200 5.0 g | BA 40 g MMA 47 g | AIBN 6.3 g | 35° C. for 24 h 60° C. for 70 h | viscous yellow liquid |
| 46 | PEI, SP-200 5.0 g | BA 20 g MMA 62 g | AIBN 6.3 g | 35° C. for 24 h 60° C. for 70 h | solid |
| 47 | PEI, SP-200 5.0 g | MA 54 g i-BMA 22 g | AIBN 6.3 g | 35° C. for 24 h 60° C. for 70 h | viscous yellow liquid |
| 48 | PEI, SP-200 5.0 g | MA 40 g i-BMA 44 g | AIBN 6.3 g | 35° C. for 24 h 60° C. for 70 h | viscous yellow liquid |
| 49 | PEI, SP-200 5.0 g | MA 40 g MMA 31 g | AIBN 6.3 g | 35° C. for 24 h 60° C. for 70 h | solid |
| 50 | PEI, SP-200 5.0 g | MA 40 g t-BA 40 g | AIBN 6.3 g | 35° C. for 24 h 60° C. for 70 h | viscous yellow liquid |

TABLE 1-continued

| Example | Polyamine | Acrylate monomer | Free radical initiator | Reaction condition | Appearance |
|---|---|---|---|---|---|
| 51 | PEI, SP-200 5.0 g | MA 27 g i-BMA 67 g | AIBN 6.3 g | 35° C. for 24 h 60° C. for 70 h | viscous yellow liquid |
| 52 | PEI, SP-200 5.0 g | MA 13 g i-BMA 89 g | AIBN 6.3 g | 35° C. for 24 h 60° C. for 70 h | viscous yellow liquid |
| 53 | PEI, SP-200 5.0 g | MMA 31 g t-BA 60 g | AIBN 6.3 g | 35° C. for 24 h 60° C. for 70 h | viscous yellow liquid |
| 54 | PEI, SP-200 5.0 g | i-BA 40 g t-BA 60 g | AIBN 6.3 g | 35° C. for 24 h 60° C. for 70 h | yellow liquid |
| 55 | PEI, SP-200 5.0 g | i-BA 60 g t-BA 40 g | AIBN 6.3 g | 35° C. for 24 h 60° C. for 70 h | yellow liquid |
| 56 | PEI, SP-200 5.0 g | BMA 66 g t-BA 40 g | AIBN 6.3 g | 35° C. for 24 h 60° C. for 70 h | yellow liquid |
| 57 | PEI, SP-200 5.0 g | BMA 44 g t-BA 60 g | AIBN 6.3 g | 35° C. for 24 h 60° C. for 70 h | yellow liquid |
| 58 | PEI, SP-200 5.0 g | BMA 66 g i-BA 40 g | AIBN 6.3 g | 35° C. for 24 h 60° C. for 70 h | viscous yellow liquid |
| 59 | PEI, SP-200 5.0 g | BMA 44 g i-BA 60 g | AIBN 6.3 g | 35° C. for 24 h 60° C. for 70 h | yellow liquid |
| 60 | PEI, SP-200 5.0 g | BA 40 g MMA 23 g i-BA 30 g | AIBN 6.3 g | 35° C. for 24 h 60° C. for 70 h | viscous yellow liquid |
| 61 | PEI, SP-200 5.0 g | BA 60 g MMA 16 g i-BA 20 g | AIBN 6.3 g | 35° C. for 24 h 60° C. for 70 h | viscous yellow liquid |
| 62 | PEI, SP-200 5.0 g | MA 13 g BMA 67 g t-BA 20 g | AIBN 6.3 g | 35° C. for 24 h 60° C. for 70 h | yellow liquid |
| 63 | PEI, SP-200 5.0 g | MA 20 g BMA 44 g t-BA 30 g | AIBN 6.3 g | 35° C. for 24 h 60° C. for 70 h | yellow liquid |
| 64 | PEI, SP-200 5.0 g | MMA 23 g BMA 44 g t-BA 30 g | AIBN 6.3 g | 35° C. for 24 h 60° C. for 70 h | viscous yellow liquid |

The molecular weight of the examples was listed in Table 2 below.

TABLE 2

| Example | $M_n$ | $M_w$ | $M_w/M_n$ |
|---|---|---|---|
| 2 | 8,650 | 42,400 | 4.9 |
| 12 | 21,600 | 83,000 | 3.8 |
| 22 | 18,400 | 81,200 | 4.4 |
| 26 | 10,060 | 52,300 | 5.2 |
| 27 | 9,320 | 45,700 | 4.9 |
| 43 | 13,300 | 42,100 | 3.2 |
| 54 | 14,040 | 63,200 | 4.5 |
| 62 | 10,050 | 55,300 | 5.5 |

Mw: weight average molecular weight
Mn: number average molecular weight

Performance Screening

In order to test the dispersion effect of the obtained samples, Resin Free Pigment Concentrates were prepared according to the Formulation 1. The mill base was dispersed in Scandex Shaker for 1.5 h with the help of glass beads. Afterwards the mill base was filtered and stored at room temperature overnight. Let-downs (Formulation 2) for testing were based on a stoving enamel, a CAB base coat and a TPA base coat. Formulation 3 shows the paint formulations for the stoving enamel, CAB paints and TPA paints. The paint preparation was mixed under high speed stirring for 5 minutes at 2000 rpm, and applied on polyester film with a 35-75 μm film thickness. After preparing draw-downs, the rest of paints were diluted 1:1 with butyl acetate for a pour-out test.

First, the competitive grades were synthesized according to patents, e.g. WO 9421368, U.S. Pat. No. 6,583,213, and U.S. Pat. No. 6,599,947 and so on. The performance of these grades was tested according to Formulations 1, 2, and 3. Results showed competitive product A performs better than the others, which was then taken as a representative dispersant in the text.

Formulations 1. Preparation of Pigment Concentrates

| Ingredients/Pigment Concentrate No. | 1 | 2 | 3 |
|---|---|---|---|
| 1) Dispersant (100% solid) | 5.35 | 5.40 | 3.62 |
| 2) 1-methoxy-2-propyl acetate (MPA) | 19.65 | 26.60 | 31.38 |
| 3) Pigment White 21 | 75.00 | | |
| 4) Pigment Black 7 (Special Black 100) | | 18.00 | |
| 5) Pigment Blue 15:2 | | | 15.00 |
| 6) 3.0 mm glass beads | 100.0 | 100.0 | 100.0 |
| Total (g) | 200.0 | 150.0 | 150.0 |

Formulations 2. Let-Down Systems

| | | |
|---|---|---|
| a) Stoving Enamel | Vialkyd AC 451 | 68.4 |
| | Maprenal MF 650 | 31.4 |
| | Ciba ®EFKA ®3030 | 0.2 |
| | Total | 100 |
| b) CAB base coat | CAB 531-1 | 11.2 |
| | Butyl acetate | 51.9 |
| | Uracron CR 226 XB | 32.1 |
| | Uramex MF 821 | 4.8 |
| | Total | 100.0 |

-continued

| | | |
|---|---|---|
| c) TPA base coat | Paraloid B66 | 40 |
| | Xylene | 8.0 |
| | Toluene | 38 |
| | MPA | 13.5 |
| | Ciba ®EFKA ®3030 | 0.5 |
| | Total | 100.0 |

Vialkyd AC 451: alkyd resin, UCB
Maprenal MF 650: melamine resin, Degussa
Ciba ®EFKA ®3030 is a modified polysiloxane solution slip and levelling agent
CAB-531: cellulose acetate butyrate material commercially available from Eastman Chemical
Uracron CR 226 XB: DSM Coating Resins Uracron CR, OH acrylic
Uramex MF 821: DSM Coating Resins Uramex (amino)
Paraloid B66: thermoplastic acrylate, Rohm Haas Formulation 3. CAB and Stoving Enamel Paints

| Code | 1 | 2 | 3 |
|---|---|---|---|
| Let-down (formulation 2a or 2b) | 9.0 | 7.5 | 7.0 |
| PC white (No. 2 in Formulation 1) | — | 2.0 | 3.0 |
| PC color (No. 4-6 in Formulation 1) | 1.0 | 0.5 | — |
| Total/g | 10.0 | 10.0 | 10.0 |

The performance of examples 1-64 in Table 1 were tested according to Formulations 1, 2 and 3. It was observed that the pigment concentrates flow well and their viscosities were comparable or lower than the competitive product A. The rheological behavior of the pigment concentrates was measured with a Thermo-Haake RheoStress 600 equipment under the CR mode. The initial viscosities ($\eta_0$) and dynamic viscosities ($\eta_t$) of the pigment concentrations are listed in Table 3. According to the viscosity curves, the Pigment White concentrate (PW 21) is a Newtonian flow, while the Pigment Black concentrate (Special Black-100) is a pseudoplastic flow. The Pigment Blue concentrate (PB 15:2) is plastic flows with thixotropic properties, but could easily flow under a low shear stress ($\tau$ in Table 3).

TABLE 3

Rheological data of Pigment Concentrates

| | PW 21 | | Special Black 100 | | PB 15:2 | |
|---|---|---|---|---|---|---|
| Example | $\eta_0$ mPas | $\eta_t$ mPas | $\eta_0$ mPas | $\eta_t$ mPas | T/Pa (Yield point) | $\eta_t$ mPas |
| Competitive product A | 1000 | 360 | >1000 | 300 | 50 | 150 |
| 2 | 480 | 210 | 620 | 160 | 30 | 90 |
| 12 | 450 | 200 | 600 | 155 | 30 | 85 |
| 22 | 700 | 330 | 380 | 80 | 25 | 75 |
| 26 | 520 | 220 | 330 | 70 | 20 | 70 |
| 27 | 750 | 300 | 400 | 80 | 25 | 75 |
| 43 | 560 | 250 | 370 | 80 | 35 | 90 |
| 54 | 450 | 210 | 350 | 65 | 18 | 60 |
| 62 | 340 | 180 | 520 | 150 | 25 | 65 |

Competitive product A is prepared according to U.S. Pat. No. 6,583,213, Ex. 9. (2-Hydroxyethylacrylate-epsilon-caprolactone-, .delta.-valerolactone (1:8:8) PEI (13:1)

Tested in stove enamel paint, CAB paint and especially in TPA paint, the performance of the dispersants was generally very good with satisfactory results, e.g. high gloss (on average, above 80 at 60°), no seeding, no rub-out, good color strength, etc (Table 4).

TABLE 4

The dispersion effect in TPA paint system

| | Gloss of drawdown 20°/60° | | | Seeding | | | Gloss of pour out 20°/60° | | |
|---|---|---|---|---|---|---|---|---|---|
| Example | white | black | blue | white | black | blue | white | black | blue |
| Competitive product A | 51/76 | 46/76 | 60/80 | 5 | 3 | 4 | 63/83 | 62/81 | 42/77 |
| 2 | 72/82 | 75/83 | 78/85 | 1 | 1 | 1 | 70/81 | 74/83 | 54/82 |
| 9 | 70/81 | 76/84 | 75/83 | 2 | 1 | 1 | 69/80 | 75/84 | 52/80 |
| 12 | 71/82 | 72/83 | 79/87 | 2 | 2 | 1 | 70/82 | 72/82 | 58/85 |
| 19 | 69/80 | 74/82 | 75/81 | 2 | 1 | 2 | 67/79 | 71/80 | 51/79 |
| 22 | 74/83 | 74/84 | 76/83 | 1 | 1 | 2 | 71/82 | 73/82 | 52/80 |
| 26 | 71/80 | 74/82 | 77/84 | 2 | 1 | 1 | 69/80 | 73/83 | 52/81 |
| 27 | 73/82 | 74/84 | 77/86 | 1 | 1 | 1 | 71/82 | 72/82 | 55/83 |
| 40 | 70/81 | 68/79 | 76/83 | 2 | 2 | 2 | 67/78 | 70/80 | 50/79 |
| 42 | 71/83 | 74/80 | 77/85 | 1 | 2 | 1 | 69/80 | 72/80 | 53/83 |
| 43 | 70/81 | 76/84 | 75/82 | 2 | 1 | 2 | 70/80 | 75/84 | 52/80 |
| 59 | 71/81 | 73/82 | 76/84 | 1 | 2 | 2 | 69/79 | 71/82 | 53/81 |
| 64 | 73/83 | 73/82 | 79/86 | 1 | 1 | 1 | 71/81 | 72/81 | 55/83 |

Explanation results:
s = seeding;
1 = no seeding, and
5 = a lot of seeding

In the solubility test, samples were dissolved in various solvents first with a concentration of 50% (w/w), and then kept for one month at 25° C. and −15° C., respectively. Obviously, the dispersants of this invention have improved solubility compared to that of competitive products (Table 5). It indicates that the invention samples have less crystallizability, and their compatibility in various solvent systems is better than that of the competitive product A.

TABLE 5

| | Solubility of samples in various solvent (50%, w/w) | | | | | | | |
|---|---|---|---|---|---|---|---|---|
| | MPA | | n-butyl acetate | | 2-Butanone | | Xylene | |
| Example | 25° C. | −15° C. | 25° C. | −15° C. | 25° C. | −15° C. | 25° C. | −15° C. |
| Product A | +− | − | +− | − | + | +− | + | +− |
| 2 | + | + | + | + | + | + | + | + |
| 12 | + | + | + | + | + | + | + | + |
| 26 | + | + | + | + | + | + | + | + |
| 27 | + | + | + | + | + | + | + | + |
| 40 | + | + | + | + | + | + | + | + |
| 43 | + | + | + | + | + | + | + | + |
| 54 | + | + | + | + | + | + | + | + |
| 62 | + | + | + | + | + | + | + | + |

Explanation results:
+: solubility is good, and the solution is clear;
+−: solubility is medium and partially crystallized;
−: solubility is poor and totally crystallized.

The invention claimed is:

1. A liquid polyamine or polyimine-g-polyacrylate grafted copolymer blend of the general formula 1 or a mixture of formula 1 and an acrylate polymer of the general formula Y $$T-(A1,A2)-Y \qquad 1$$

wherein
T is a polyamine or polyimine
A1 is an amide

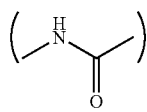

or imide

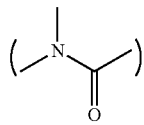

bridging bond,
A2 is a —N—C— bridging bond,
Y is an acrylate residue of the general formula 2,

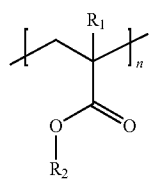

wherein,
$R_1$ and $R_2$ are, independently, hydrogen, $C_{1-20}$alkyl, aryl, heteroaryl or substituted aryl,
n is a number of 1-1000,
wherein the polyamine-g-polyacrylate grafted copolymer blend has an average molecular weight of 50 000 g/mol to 150 000 g/mol and a polydispersity $M_w/M_n$ greater than 3 and equal to or less than 5.5.

2. The polyamine or polyimine-g-polyacrylate grafted copolymer blend according to claim 1, wherein T is polyethyleneimine, $R_1$ is hydrogen or methyl, $R_2$ is $C_{1-20}$alkyl and n is 5 to 100.

3. A process for the preparation of a polyamine or polyimine-g-polyacrylate grafted copolymer blend as defined in claim 1, by copolymerizing in an organic solvent a polyamine and an acrylate monomer in the presence of a free radical initiator wherein 1. the weight ratio of polyamine to the acrylate monomer ranges from 1:5 to 1:100;
2. the weight ratio of free radical initiator to acrylate monomer ranges from 1:5 to 1:100;
3. the process is carried out in one pot at a temperature of from 10° C. to 200° C. under an inert gas atmosphere;
4. the process comprises a transesterification reaction of the acrylate with the polyamine to obtain a polyamine amide or a polyamine imide, a Michael addition reaction of a polyamine with an acrylate monomer to obtain a polyamine acrylate and a grafting polymerisation of a polyamine and acrylate monomers to obtain polyamine-g-polyacrylate.

4. The liquid polyamine or polyimine-g-polyacrylate grafted copolymer blend according to claim 1, comprising a blend of

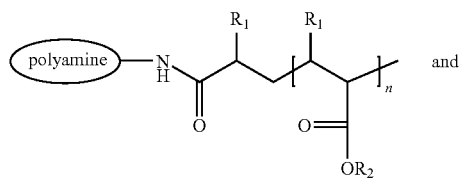 and

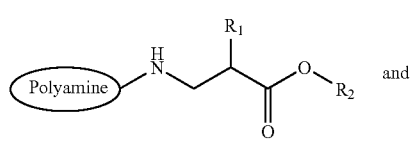 and

17
-continued
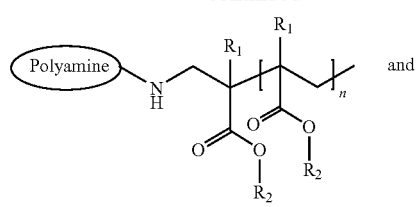
and
18
-continued
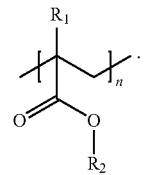
* * * * *